US005551692A

United States Patent [19]
Pettit et al.

[11] Patent Number: 5,551,692
[45] Date of Patent: Sep. 3, 1996

[54] ELECTRONIC GAME PROMOTION DEVICE

[75] Inventors: Donald W. Pettit; Terrence W. Plourd, both of Las Vegas, Nev.

[73] Assignee: Casino Coin Company, Inc., Las Vegas, Nev.

[21] Appl. No.: 284,787

[22] Filed: Aug. 2, 1994

[51] Int. Cl.[6] .............................. A63B 71/00; A63F 1/00; G06F 17/00; G06G 7/48

[52] U.S. Cl. ....................... 273/143R; 273/139; 364/410; 364/412; 463/16

[58] Field of Search .......................... 273/138 A, 138 R, 273/143 R, 139, DIG. 28; 364/410–412

[56] References Cited

U.S. PATENT DOCUMENTS

| | | | |
|---|---|---|---|
| 4,240,635 | 12/1980 | Brown | 273/138 A |
| 4,335,809 | 6/1982 | Wain . | |
| 4,448,419 | 5/1984 | Telnaes | 273/138 A |
| 4,494,197 | 1/1985 | Troy et al. | 273/138 A |
| 4,573,681 | 3/1986 | Okada . | |
| 4,624,459 | 11/1986 | Kaufman . | |
| 4,657,256 | 4/1987 | Okada | 273/138 A |
| 4,711,451 | 12/1987 | Pajak et al. | 273/143 R |
| 4,854,590 | 8/1989 | Jolliff et al. . | |
| 4,982,346 | 1/1991 | Girouard et al. . | |
| 4,993,714 | 2/1991 | Golightly . | |
| 5,007,641 | 4/1991 | Seidman . | |
| 5,080,364 | 1/1992 | Seidman . | |
| 5,083,785 | 1/1992 | Okada | 273/143 R |
| 5,096,195 | 3/1992 | Gimmon . | |
| 5,116,055 | 5/1992 | Tracy | 273/143 R |
| 5,135,224 | 8/1992 | Yamamoto et al. . | |
| 5,176,380 | 1/1993 | Evans et al. . | |
| 5,290,033 | 3/1994 | Bittner et al. | 273/138 A |
| 5,393,061 | 2/1995 | Manship et al. | 273/138 A |

FOREIGN PATENT DOCUMENTS

| | | | |
|---|---|---|---|
| 2106294 | 4/1983 | United Kingdom | 273/138 A |
| 2256519 | 12/1992 | United Kingdom | 273/138 A |

Primary Examiner—Jessica J. Harrison
Assistant Examiner—Mark A. Sager
Attorney, Agent, or Firm—Donald C. Casey

[57] ABSTRACT

A promotional system sponsored by retailers or others wishing to target the public uses a gaming machine and a method for operating that machine. An operator can program the machine so that within a predetermined number of operations or plays a predetermined number of wins occurs. Prizes associated with each of the wins can also be preprogrammed so that coupons are printed indicating the prize when a win occurs. Precise win/lose percentages are maintained by way of counters and a CPU programmed to switch status when a predetermined number of wins or losses has occurred, or when the operator desires to change the win/lose ratio and/or play cycle.

6 Claims, 6 Drawing Sheets

Figure 1

| | | | | | CYCLES | | | | | | |
|---|---|---|---|---|---|---|---|---|---|---|---|
| 100 | 20000 | 10000 | 5000 | 2500 | 1000 | 500 | 250 | 100 | 75 | 50 | 25 |
| CCX | 1667 | 0834 | 0834 | 0209 | 0084 | 0042 | 0021 | 0009 | 0007 | 0004 | 0002 |
| OOX | 1667 | 0834 | 0834 | 0209 | 0084 | 0042 | 0021 | 0009 | 0006 | 0004 | 0002 |
| PPX | 1667 | 0833 | 0833 | 0208 | 0083 | 0042 | 0021 | 0008 | 0006 | 0004 | 0002 |
| AAX | 1667 | 0833 | 0833 | 0208 | 0083 | 0042 | 0021 | 0008 | 0006 | 0004 | 0002 |
| GGX | 1667 | 0833 | 0833 | 0208 | 0083 | 0042 | 0021 | 0008 | 0006 | 0004 | 0002 |
| MMX | 1667 | 0833 | 0833 | 0208 | 0083 | 0042 | 0021 | 0008 | 0006 | 0004 | 0002 |
| CCC | 1666 | 0833 | 0833 | 0208 | 0083 | 0041 | 0021 | 0008 | 0006 | 0004 | 0002 |
| OOO | 1666 | 0833 | 0833 | 0208 | 0083 | 0041 | 0021 | 0008 | 0006 | 0004 | 0002 |
| PPP | 1666 | 0833 | 0833 | 0208 | 0083 | 0041 | 0020 | 0008 | 0006 | 0004 | 0002 |
| AAA | 1666 | 0833 | 0833 | 0208 | 0083 | 0041 | 0020 | 0008 | 0006 | 0004 | 0002 |
| GGG | 1666 | 0833 | 0833 | 0208 | 0083 | 0041 | 0020 | 0008 | 0006 | 0004 | 0002 |
| MMM | 1666 | 0833 | 0833 | 0208 | 0083 | 0041 | 0020 | 0008 | 0006 | 0004 | 0001 |
| BBB | 0001 | 0001 | 0001 | 0001 | 0001 | 0001 | 0001 | 0001 | 0001 | 0001 | 0001 |
| 777 | 0001 | 0001 | 0001 | 0001 | 0001 | 0001 | 0001 | 0001 | 0001 | 0001 | 0001 |
| 075 | 20000 | 10000 | 5000 | 2500 | 1000 | 500 | 250 | 100 | 75 | 50 | 25 |
| CCX | 1250 | 0625 | 0313 | 0157 | 0063 | 0032 | 0016 | 0007 | 0005 | 0003 | 0002 |
| OOX | 1250 | 0625 | 0313 | 0156 | 0063 | 0031 | 0016 | 0006 | 0005 | 0003 | 0002 |
| PPX | 1250 | 0625 | 0313 | 0156 | 0063 | 0031 | 0016 | 0006 | 0005 | 0003 | 0002 |
| AAX | 1250 | 0625 | 0313 | 0156 | 0063 | 0031 | 0016 | 0006 | 0005 | 0003 | 0002 |
| GGX | 1250 | 0625 | 0312 | 0156 | 0062 | 0031 | 0016 | 0006 | 0005 | 0003 | 0002 |
| MMX | 1250 | 0625 | 0312 | 0156 | 0062 | 0031 | 0016 | 0006 | 0005 | 0003 | 0001 |
| CCC | 1250 | 0625 | 0312 | 0156 | 0062 | 0031 | 0015 | 0006 | 0004 | 0003 | 0001 |
| OOO | 1250 | 0625 | 0312 | 0156 | 0062 | 0031 | 0015 | 0006 | 0004 | 0003 | 0001 |
| PPP | 1250 | 0625 | 0312 | 0156 | 0062 | 0031 | 0015 | 0006 | 0004 | 0003 | 0001 |
| AAA | 1250 | 0625 | 0312 | 0156 | 0062 | 0031 | 0015 | 0006 | 0004 | 0003 | 0001 |
| GGG | 1249 | 0624 | 0312 | 0156 | 0062 | 0031 | 0015 | 0006 | 0004 | 0003 | 0001 |
| MMM | 1249 | 1624 | 0312 | 0156 | 0062 | 0031 | 0015 | 0006 | 0004 | 0003 | 0001 |
| BBB | 0001 | 0001 | 0001 | 0001 | 0001 | 0001 | 0001 | 0001 | 0001 | 0001 | 0001 |
| 777 | 0001 | 0001 | 0001 | 0001 | 0001 | 0001 | 0001 | 0001 | 0001 | 0001 | 0001 |

FIGURE 2A

| | | | | | CYCLES | | | | | | |
|---|---|---|---|---|---|---|---|---|---|---|---|
| 050 | 20000 | 10000 | 5000 | 2500 | 1000 | 500 | 250 | 100 | 75 | 50 | 25 |
| CCX | 0834 | 0417 | 0209 | 0104 | 0042 | 0021 | 0011 | 0004 | 0003 | 0002 | 0001 |
| OOX | 0834 | 0417 | 0209 | 0104 | 0042 | 0021 | 0011 | 0004 | 0003 | 0002 | 0001 |
| PPX | 0833 | 0417 | 0208 | 0104 | 0042 | 0021 | 0011 | 0004 | 0003 | 0002 | 0001 |
| AAX | 0833 | 0417 | 0208 | 0104 | 0042 | 0021 | 0010 | 0004 | 0003 | 0002 | 0001 |
| GGX | 0833 | 0417 | 0208 | 0104 | 0042 | 0021 | 0010 | 0004 | 0003 | 0002 | 0001 |
| MMX | 0833 | 0417 | 0208 | 0104 | 0042 | 0021 | 0010 | 0004 | 0003 | 0002 | 0001 |
| CCC | 0833 | 0416 | 0208 | 0104 | 0041 | 0021 | 0010 | 0004 | 0003 | 0002 | 0001 |
| OOO | 0833 | 0416 | 0208 | 0104 | 0041 | 0021 | 0010 | 0004 | 0003 | 0002 | 0001 |
| PPP | 0833 | 0416 | 0208 | 0104 | 0041 | 0020 | 0010 | 0004 | 0003 | 0002 | 0001 |
| AAA | 0833 | 0416 | 0208 | 0104 | 0041 | 0020 | 0010 | 0004 | 0003 | 0002 | 0001 |
| GGG | 0833 | 0416 | 0208 | 0104 | 0041 | 0020 | 0010 | 0004 | 0003 | 0002 | 0001 |
| MMM | 0833 | 0416 | 0208 | 0104 | 0041 | 0020 | 0010 | 0004 | 0003 | 0001 | 0001 |
| BBB | 0001 | 0001 | 0001 | 0001 | 0001 | 0001 | 0001 | 0001 | 0001 | 0001 | 0001 |
| 777 | 0001 | 0001 | 0001 | 0001 | 0001 | 0001 | 0001 | 0001 | 0001 | 0001 | 0001 |
| 040 | 20000 | 10000 | 5000 | 2500 | 1000 | 500 | 250 | 100 | 75 | 50 | 25 |
| CCX | 0667 | 0334 | 0167 | 0084 | 0034 | 0017 | 0009 | 0004 | 0003 | 0002 | 0001 |
| OOX | 0667 | 0334 | 0167 | 0084 | 0034 | 0017 | 0009 | 0004 | 0003 | 0002 | 0001 |
| PPX | 0667 | 0333 | 0167 | 0083 | 0033 | 0017 | 0008 | 0003 | 0003 | 0002 | 0001 |
| AAX | 0667 | 0333 | 0167 | 0083 | 0033 | 0017 | 0008 | 0003 | 0003 | 0002 | 0001 |
| GGX | 0667 | 0333 | 0167 | 0083 | 0033 | 0017 | 0008 | 0003 | 0002 | 0002 | 0001 |
| MMX | 0667 | 0333 | 0167 | 0083 | 0033 | 0017 | 0008 | 0003 | 0002 | 0002 | 0001 |
| CCC | 0666 | 0333 | 0166 | 0083 | 0033 | 0016 | 0008 | 0003 | 0002 | 0001 | 0001 |
| OOO | 0666 | 0333 | 0166 | 0083 | 0033 | 0016 | 0008 | 0003 | 0002 | 0001 | 0001 |
| PPP | 0666 | 0333 | 0166 | 0083 | 0033 | 0016 | 0008 | 0003 | 0002 | 0001 | 0001 |
| AAA | 0666 | 0333 | 0166 | 0083 | 0033 | 0016 | 0008 | 0003 | 0002 | 0001 | 0001 |
| GGG | 0666 | 0333 | 0166 | 0083 | 0033 | 0016 | 0008 | 0003 | 0002 | 0001 | 0001 |
| MMM | 0666 | 0333 | 0166 | 0083 | 0033 | 0016 | 0008 | 0003 | 0002 | 0001 | 0001 |
| BBB | 0001 | 0001 | 0001 | 0001 | 0001 | 0001 | 0001 | 0001 | 0001 | 0001 | 0001 |
| 777 | 0001 | 0001 | 0001 | 0001 | 0001 | 0001 | 0001 | 0001 | 0001 | 0001 | 0001 |

FIGURE 2B

| %   |       |       |      |      | CYCLES |     |     |     |     |     |     |
|-----|-------|-------|------|------|------|-----|-----|-----|-----|-----|-----|
| 030 | 20000 | 10000 | 5000 | 2500 | 1000 | 500 | 250 | 100 | 75  | 50  | 25  |
| CCX | 0500  | 0250  | 0125 | 0063 | 0025 | 0013 | 0007 | 0003 | 0002 | 0002 | 0001 |
| OOX | 0500  | 0250  | 0125 | 0063 | 0025 | 0013 | 0006 | 0003 | 0002 | 0001 | 0001 |
| PPX | 0500  | 0250  | 0125 | 0063 | 0025 | 0013 | 0006 | 0003 | 0002 | 0001 | 0001 |
| AAX | 0500  | 0250  | 0125 | 0063 | 0025 | 0013 | 0006 | 0003 | 0002 | 0001 | 0001 |
| GGX | 0500  | 0250  | 0125 | 0062 | 0025 | 0012 | 0006 | 0002 | 0002 | 0001 | 0001 |
| MMX | 0500  | 0250  | 0125 | 0062 | 0025 | 0012 | 0006 | 0002 | 0002 | 0001 | 0001 |
| CCC | 0500  | 0250  | 0125 | 0062 | 0025 | 0012 | 0006 | 0002 | 0002 | 0001 | 0001 |
| OOO | 0500  | 0250  | 0125 | 0062 | 0025 | 0012 | 0006 | 0002 | 0002 | 0001 | 0001 |
| PPP | 0500  | 0250  | 0125 | 0062 | 0025 | 0012 | 0006 | 0002 | 0001 | 0001 | 0001 |
| AAA | 0500  | 0250  | 0125 | 0062 | 0025 | 0012 | 0006 | 0002 | 0001 | 0001 | 0001 |
| GGG | 0499  | 0249  | 0124 | 0062 | 0024 | 0012 | 0006 | 0002 | 0001 | 0001 | 0001 |
| MMM | 0499  | 0249  | 0124 | 0062 | 0024 | 0012 | 0006 | 0002 | 0001 | 0001 | 0001 |
| BBB | 0001  | 0001  | 0001 | 0001 | 0001 | 0001 | 0001 | 0001 | 0001 | 0001 | 0001 |
| 777 | 0001  | 0001  | 0001 | 0001 | 0001 | 0001 | 0001 | 0001 | 0001 | 0001 | 0001 |
| 025 | 20000 | 10000 | 5000 | 2500 | 1000 | 500 | 250 | 100 | 75  | 50  | 25  |
| CCX | 0417  | 0209  | 0104 | 0052 | 0021 | 0011 | 0006 | 0002 | 0002 | 0001 | 0001 |
| OOX | 0417  | 0209  | 0104 | 0052 | 0021 | 0011 | 0005 | 0002 | 0002 | 0001 | 0001 |
| PPX | 0417  | 0208  | 0104 | 0052 | 0021 | 0011 | 0005 | 0002 | 0002 | 0001 | 0001 |
| AAX | 0417  | 0208  | 0104 | 0052 | 0021 | 0010 | 0005 | 0002 | 0002 | 0001 | 0001 |
| GGX | 0417  | 0208  | 0104 | 0052 | 0021 | 0010 | 0005 | 0002 | 0002 | 0001 | 0001 |
| MMX | 0417  | 0208  | 0104 | 0052 | 0021 | 0010 | 0005 | 0002 | 0001 | 0001 | 0001 |
| CCC | 0416  | 0208  | 0104 | 0052 | 0021 | 0010 | 0005 | 0002 | 0001 | 0001 | 0001 |
| OOO | 0416  | 0208  | 0104 | 0052 | 0021 | 0010 | 0005 | 0002 | 0001 | 0001 | 0001 |
| PPP | 0416  | 0208  | 0104 | 0052 | 0020 | 0010 | 0005 | 0002 | 0001 | 0001 | 0001 |
| AAA | 0416  | 0208  | 0104 | 0052 | 0020 | 0010 | 0005 | 0002 | 0001 | 0001 | 0001 |
| GGG | 0416  | 0208  | 0104 | 0052 | 0020 | 0010 | 0005 | 0002 | 0001 | 0001 | 0001 |
| MMM | 0416  | 0208  | 0104 | 0051 | 0020 | 0010 | 0005 | 0001 | 0001 | 0001 | 0001 |
| BBB | 0001  | 0001  | 0001 | 0001 | 0001 | 0001 | 0001 | 0001 | 0001 | 0001 | 0001 |
| 777 | 0001  | 0001  | 0001 | 0001 | 0001 | 0001 | 0001 | 0001 | 0001 | 0001 | 0001 |

FIGURE 2C

| %   |       |       |      | CYCLES |      |      |      |      |      |      |      |
|-----|-------|-------|------|--------|------|------|------|------|------|------|------|
| 020 | 20000 | 10000 | 5000 | 2500   | 1000 | 500  | 250  | 100  | 75   | 50   | 25   |
| CCX | 0417  | 0167  | 0084 | 0042   | 0017 | 0009 | 0004 | 0002 | 0002 | 0001 | 0001 |
| OOX | 0417  | 0167  | 0084 | 0042   | 0017 | 0009 | 0004 | 0002 | 0001 | 0001 | 0001 |
| PPX | 0417  | 0167  | 0083 | 0042   | 0017 | 0008 | 0004 | 0002 | 0001 | 0001 | 0001 |
| AAX | 0417  | 0167  | 0083 | 0042   | 0017 | 0008 | 0004 | 0002 | 0001 | 0001 | 0001 |
| GGX | 0417  | 0167  | 0083 | 0042   | 0017 | 0008 | 0004 | 0002 | 0001 | 0001 | 0001 |
| MMX | 0417  | 0167  | 0083 | 0042   | 0017 | 0008 | 0004 | 0002 | 0001 | 0001 | 0001 |
| CCC | 0416  | 0166  | 0083 | 0041   | 0016 | 0008 | 0004 | 0001 | 0001 | 0001 | 0001 |
| OOO | 0416  | 0166  | 0083 | 0041   | 0016 | 0008 | 0004 | 0001 | 0001 | 0001 | 0001 |
| PPP | 0416  | 0166  | 0083 | 0041   | 0016 | 0008 | 0004 | 0001 | 0001 | 0001 | 0001 |
| AAA | 0416  | 0166  | 0083 | 0041   | 0016 | 0008 | 0004 | 0001 | 0001 | 0001 | 0001 |
| GGG | 0416  | 0166  | 0083 | 0041   | 0016 | 0008 | 0004 | 0001 | 0001 | 0001 | 0001 |
| MMM | 0416  | 0166  | 0083 | 0041   | 0016 | 0008 | 0004 | 0001 | 0001 | 0001 | 0001 |
| BBB | 0001  | 0001  | 0001 | 0001   | 0001 | 0001 | 0001 | 0001 | 0001 | 0001 | 0001 |
| 777 | 0001  | 0001  | 0001 | 0001   | 0001 | 0001 | 0001 | 0001 | 0001 | 0001 | 0001 |
| 015 | 20000 | 10000 | 5000 | 2500   | 1000 | 500  | 250  | 100  | 75   | 50   | 25   |
| CCX | 0250  | 0125  | 0063 | 0032   | 0013 | 0007 | 0003 | 0002 | 0001 | 0001 | 0001 |
| OOX | 0250  | 0125  | 0063 | 0031   | 0013 | 0006 | 0003 | 0001 | 0001 | 0001 | 0001 |
| PPX | 0250  | 0125  | 0063 | 0031   | 0013 | 0006 | 0003 | 0001 | 0001 | 0001 | 0001 |
| AAX | 0250  | 0125  | 0063 | 0031   | 0013 | 0006 | 0003 | 0001 | 0001 | 0001 | 0001 |
| GGX | 0250  | 0125  | 0062 | 0031   | 0012 | 0006 | 0003 | 0001 | 0001 | 0001 | 0001 |
| MMX | 0250  | 0125  | 0062 | 0031   | 0012 | 0006 | 0003 | 0001 | 0001 | 0001 | 0001 |
| CCC | 0250  | 0125  | 0062 | 0031   | 0012 | 0006 | 0003 | 0001 | 0001 | 0001 | 0001 |
| OOO | 0250  | 0125  | 0062 | 0031   | 0012 | 0006 | 0003 | 0001 | 0001 | 0001 | 0001 |
| PPP | 0250  | 0125  | 0062 | 0031   | 0012 | 0006 | 0003 | 0001 | 0001 | 0001 | 0001 |
| AAA | 0250  | 0125  | 0062 | 0031   | 0012 | 0006 | 0003 | 0001 | 0001 | 0001 | 0001 |
| GGG | 0249  | 0124  | 0062 | 0031   | 0012 | 0006 | 0003 | 0001 | 0001 | 0001 | 0001 |
| MMM | 0249  | 0124  | 0062 | 0031   | 0012 | 0006 | 0003 | 0001 | 0001 | 0001 | 0001 |
| BBB | 0001  | 0001  | 0001 | 0001   | 0001 | 0001 | 0001 | 0001 | 0001 | 0001 | 0001 |
| 777 | 0001  | 0001  | 0001 | 0001   | 0001 | 0001 | 0001 | 0001 | 0001 | 0001 | 0001 |

ELECTRONIC GAME PROMOTION DEVICE

TECHNICAL FIELD

The present invention relates to electronic games in which prizes are awarded. In particular, the present invention relates to the use of such games as a promotional device.

BACKGROUND ART

The present invention relates to electronic gaming apparatus. The invention is particularly applicable for electronic gaming apparatus simulating a slot machine and is therefore described below with respect to electronic slot machines, although it will be appreciated that the invention could be advantageously used in other electronic games as well.

The conventional slot machine game includes a plurality of reels arranged in a line and provided with various symbols on their outer peripheries. A start lever is manually pulled down and then released, which starts the reels to rotate. The reels stop successively one after the other in random positions, to display different symbols on their outer peripheries. Certain combinations of these symbols when arranged in a line represent winning combinations, earning the player predetermined amounts of money according to the winning combination produced in the line of reels.

Various types of electronic machines have been developed and are now in use simulating a normal mechanical slot machine game. Examples of such electronic slot machines are described in U.S. Pat. Nos. 4,573,681, 4,684,600, 4,624,459 and 4,335,809. These patents are hereby incorporated by reference.

Games are used by various establishments seeking to attract patrons by offering something of value to those prospective patrons who enter the establishment or who purchase particular products. Such offers may be in a nature of a promised free gift to each patron, to be awarded when the patron enters the establishment. In these games, every person entering the establishment and meeting certain predetermined qualifications may receive the same gift. Likewise, incentive schemes to induce purchase of particular products or services ordinarily award the same gift to each purchaser.

Other, similar schemes utilize an element of random chance. For example, in a so-called "match and win" promotion, tokens bearing different indicia, such as different pictures or combinations of alphanumeric characters may be distributed to prospective patrons. Different prizes are associated with some or all of the different indicia, and the prize associated with each indicia is posted or otherwise made known within the establishment. Thus, the prospective patron must enter the establishment to determine what, if any, prize he has won.

Often the various indicia include one or more very rare indicia applied to only a few of the tokens and associated with prizes of significant value and other, common indicia applied to the remaining tokens associated with prizes of minimal value, or with no prize at all. As only a few patrons will win prizes of significant value, the total value of prizes distributed in the scheme will not pose a prohibitive cost to the sponsor of the scheme. Nonetheless, the possibility, albeit remote, of winning a prize of significant value may provide incentive to prospective patrons.

Although games of this nature can be a useful marketing tool, they suffer from significant drawbacks. Manufacture and distribution of the tokens is costly. Security measures must be employed to prevent persons involved in distribution of the tokens from culling out those tokens bearing the rare indicia associated with valuable prizes and diverting those tokens to their own use. Such security measures add to the cost of conducting the game. Moreover, these games provide minimal entertainment to the patron. After the game has determined what prize he has won, the game is over insofar as he is concerned. The game thus has no value whatever in inducing the customer to remain in the establishment.

Other promotional schemes have been conducted using identical tokens, such as identical coupons printed in newspaper advertisements and coupons incorporated as part of packages of goods. Ordinarily, all of the tokens or coupons used in such a scheme are identical and entitle the person holding the coupon to the same value. For example, coupons can be printed in a newspaper offering a discount on a specific item of merchandise in a store. Also, packaged goods often carry coupons which either entitle the customer to a discount on subsequent purchase of the goods or which can be redeemed for unrelated merchandise. Many of these promotions involve redemption by mail. In such promotions, the coupon or token may be imprinted with a machine readable code such as a bar code. Where packaged goods are involved, the bar code may be the universal product code or "UPC" used to identify the goods for inventory and sale purposes. Promotions of this nature generally do not provide any element of randomness. Thus, each consumer may acquire the same item of relatively small value by presenting or redeeming the coupon or token. There is no chance for the consumer to acquire a highly valuable prize.

In another system discussed in U.S. Pat. No. 5,080,364 (incorporated herein by reference), the security problems of the known art is addressed by randomly assigning prizes to patrons who present tokens bearing a common winning code. This is done when a player presents the token for redemption and the token is found to bear a common winning code. Several classes of tokens may be used with the tokens of each class bearing the same common winning code. However, the common codes differ among the different classes. There may be several winning codes matching the different common codes. The tokens may be distributed with goods sold at retail, as by distributing packages of goods bearing the tokens through normal retail sale distribution channels. Most desirably, the token may be a part of the goods package bearing a machine readable product identification code.

Moreover, the game may be conveniently associated with purchase of particular products. Where a universal product code symbol or other portion of a package for particular goods constitutes the token, the prospective patron of the establishment must purchase the goods in order to play the game. When the redemption location is at an establishment other than the location where the goods are sold, the patron must visit the other establishment as well. This provides a "tie-in" in that the game promotes both the goods and the other establishment.

However, there may be little incentive for a player to enter the subject retail establishment in the first place. Nor is there any particular inducement for a potential player to pick up a coupon or a token at some other location. If a token is not presented to a potential player as part of a goods package (such as in the case when the potential player has no particular reason to purchase the subject goods), there is little inducement to bring a potential player into the retail outlet, or for him to bother picking up a coupon at some other location.

DISCLOSURE OF THE INVENTION

An object of the present invention is to provide a system for inducing members of the public to pick up promotional materials.

Another object of the present invention is to precisely control the occurrences of free prizes given with any group of promotion materials presented to the public.

A further object of the invention is to provide a new type of electronic gaming apparatus simulating a mechanical slot machine game.

These and other objects of the present invention are accomplished by inducing members of the public to take promotional materials as part of a game in which an electronic slot machine-like device is used to present winning players with promotion coupons having predetermined prize values. The use of a device similar to the slot machine capitalizes on the well-known allure that slot machines exercise over many individuals. Consequently, an individual playing the game will probably be far more excited and take a winning coupon far more seriously than if such coupons were merely handed out at random. Such excitement will induce winning individuals to go through the time and trouble of cashing in the winning coupons at the respective retail outlets. Thus, the use of the machine will further the promotional goals of the sponsoring retail operators associated with the winning coupons.

The normal drawbacks of standard slot machines are avoided in that a player need not insert money into the machine in order to play. Further, since the gaming device uses an electronic configuration simulating a normal mechanical slot machine, the gaming device is not limited by the mechanical characteristics of normal slot machines. Nor is the present machine subject to the same regulatory restrictions as normal slot machines. Consequently, the gaming device used to carry out the present invention can be located anywhere deemed appropriate for the promotion of the sponsoring retailers associated with the coupons. The gaming devices can be preprogrammed by operators (according to the instructions of the retailers associated with the winning coupons) to determine how many winners and what kind of prizes will be made available. Winners are determined at the time that the game is played. Consequently, there is no necessity for win/lose determination at the retail outlets associated with the coupons. As a result, coupon redemption is simplified. Using this system, retailers can target specific locations (and the people thereat), providing winning coupons on a proportional basis determined by the importance of each location targeted.

This is accomplished by a method in which a gaming machine is activated (without coins or tokens) to carry out a play or an operation generating a virtual combination of symbols. The machine then determines the winner or loser status of the virtual combination of symbols based upon a preprogrammed win-lose percentage. Once the status is determined, a counter corresponding to the appropriate status is checked to determine if a predetermined count value stored in the counter has been reached. If not, the counter is decremented and the virtual combination of symbols is displayed for the player. At the same time a coupon indicative of both the status and a corresponding prize for that play (based upon the virtual combination of symbols) is generated for the player.

The promotional gaming device for carrying out the aforementioned method includes activation means for starting the operation of the gaming device in order to carry out a play. The device also includes a central processing unit having means for generating a virtual combination of symbols; means for determining winner or loser status for the virtual combination of symbols; means for counting occurrences of winner and loser status for a plurality of plays within a cycle defined by a predetermined number of plays; and means for altering the winner or loser status for a play based upon a number of occurrences of winner or loser status in the means for counting. The device also has a display arranged to indicate the virtual combination of symbols to a player operating the gaming device.

BRIEF DESCRIPTION OF DRAWINGS

FIGS. 2A–2D are win/loss tables selected by the machine operator to determine win/loss percentage.

BEST MODE FOR CARRYING OUT THE INVENTION

Figure 1:
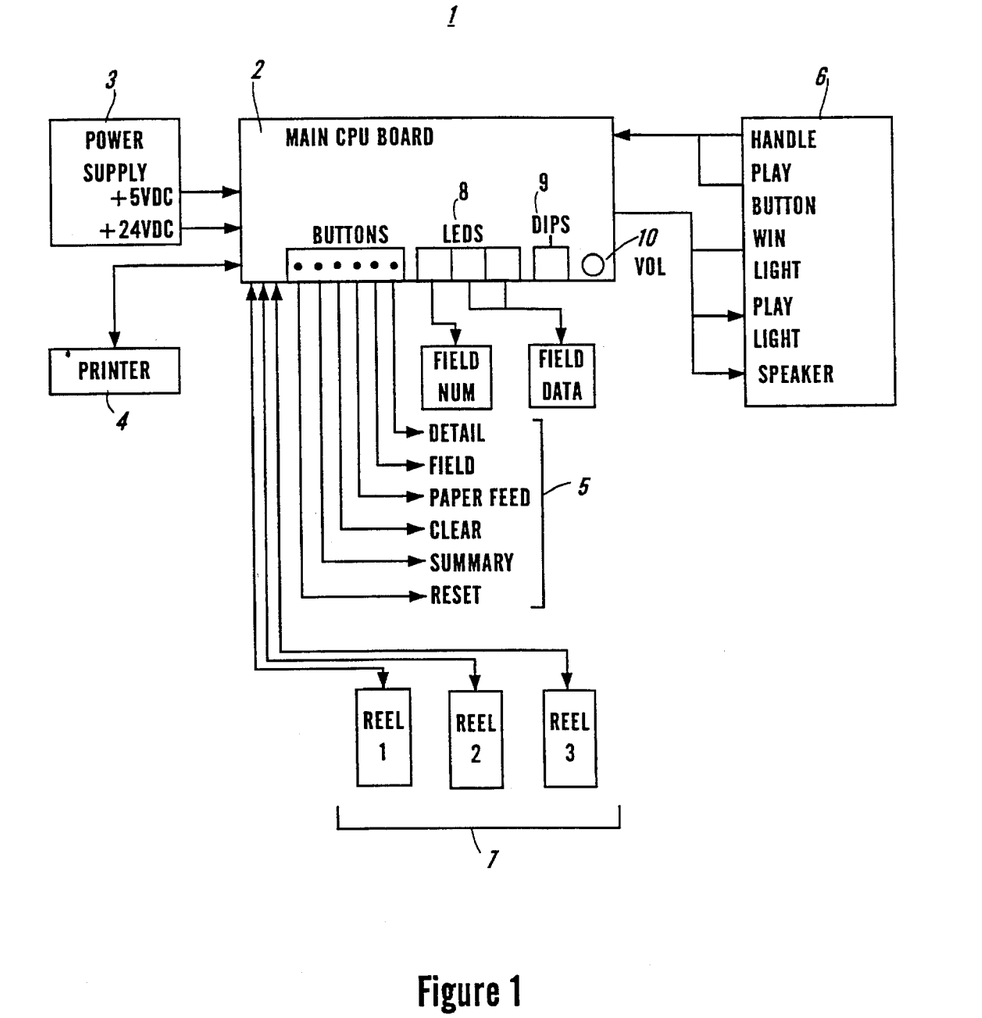
FIG. 1 is a block diagram of an electronic slot machine, illustrating the functional controls associated therewith.

The gaming apparatus illustrated in FIG. 1 is an electronic and coinless slot machine designed specifically for use as a promotional device, dispensing coupons associated with retailers sponsoring the game. If the gaming devices are not located at sites controlled by sponsoring retailers, it is expected that proprietors of the sites at which the gaming machines are located will be paid by the retailers for presenting the machines to the public and maintaining the security of those machines. It is also necessary that the site managers will maintain control over how many plays a given individual is allowed, based upon instructions received from the respective sponsoring retailers.

Electronic slot machine 1 as depicted in FIG. 1 includes a main CPU board or central processing unit. This unit is programmable and can carry out a program used to simulate the operation of a normal mechanical slot machine as is described in U.S. Pat. No. 5,096,195, incorporated herein by reference. In contra-distinction to the aforementioned patent, the gaming device of the present invention is specifically programmable for a predetermined number of winning occurrences during a play cycle defined by a predetermined number of operations or plays. Further, along with the normal specified number of wins based upon a predetermined win/lose percentage, the machine of the present invention can also include at least one occurrence of a combination based solely on random probability. Likewise, the CPU 2 can be programmed for at least one occurrence of a predetermined combination of symbols for a single play cycle. Along with the programming of occurrences of combinations of symbols, such as would incur with a normal mechanical slot machine, the prizes associated with each occurrence can preprogrammed. Consequently, a winner would know what he or she has won, and where to collect the prize. The collection of the prize would bring the winner into the retail establishment, thus, for achieving the goal of the gaming system of the present invention.

FIGS. 2A–2D, attached hereto, includes eight tables that can be generated from the appropriate program to simulate operation of a normal mechanical slot machine. Based upon these tables, a programmer can select a winning percentage, such as 100%, 75%, 50%, etc., for a play cycle containing a predetermined number of operations or plays. The number of plays in a cycle are shown in the top horizontal line of each of the tables, to the right of the winning percentage value selected. Underneath the percentage value is a list of each of the symbol combinations provided by the slot machine. To the right of this column are the numbers of occurrences for each group of symbols generated in accordance with the number of plays in each play cycle.

It is noted that unlike a normal slot machine, the winning combinations are generated electronically rather than through the well known mechanical method. Thus, the combinations of symbols generated are merely virtual creations of the CPU, and are not known to a player until the process of the present invention is carried out and the numbers are displayed to the player.

Because CPU 2 can operate a variety of different number and symbol generating programs, the present invention is not confined to simulating the operation of a standard slot machine with sixty-four stops. Modifications of slot machine operation can be used with the present invention. For example, 128 virtual stops can be used instead of the normal sixty-four. The selection of win or lose status can be altered to virtually any set of parameters or criteria found acceptable to the sponsors and operators of the gaming device. The selection of combinations of virtual symbols can be modified so that a greater number of possible symbols are used or a lesser number can be used. The simulation of other games or other machines is possible with the proper programming. Such programming is generally well known or within the capability of ordinary programmers. Along with CPU 2, the gaming device includes a power supply 3.

Printer 4 is a key aspect of the present invention in that the winnings of each player are reflected on coupons. These coupons contain indicia of prizes offered by the retailers supporting or sponsoring the operation of the subject gaming system, and are used to bring winners into the retailers' establishments. The coupons printed upon winning a game are given significance by the excitement inherent to playing a slot machine.

This excitement is enhanced by the similarity of the present gaming device to real mechanical slot machines. Similarity is in part brought about by display 7 including three reels. These display the virtual combination of symbols generated in the main CPU 2. This similarity is increased by the play controls 6. This includes a physical handle (not shown) similar to that of a normal mechanical slot machine. This handle activates an electronic control or play button which begins the operation of the machine for a single play. Operating lights indicate when a play is in progress and when a winning combination of symbols has occurred. As with normal mechanical slot machines a speaker will provide sound effects appropriate to the win or los status of the play.

Besides the win light and play light, the gaming device includes light emitting diodes (LED) 8. These diodes indicate data used in the programming of the gaming device by an authorized operator. Also necessary for the programming operation are control buttons 5. The first two buttons, "detail" and "field" are used in the programming of the gaming device, in conjunction with LED's 8. The other buttons, "paper feed", "clear", "summary", and "reset" are used in the overall control and adjustment of the gaming device. Also used in the control and adjustment of the gaming device are DIP switches 9 and volume control 10.

The dip switches, also known as option switches provide the following functions: (1) enabling or disabling the printing of time and date of the play; (2) enabling or disabling the printing of a coupon; (3) establishing a remote mode where the game can be played only once after the remote button is pushed; and (4) automatic play where the gaming device will spin the reels 7 of the display without the play button of control group 6 being activated, either directly or by the handle. (This is used for test or demonstration modes.)

The non-programming buttons 5 have the following functions: (1) the "reset" is a hardware "reset" similar to a restart operation but carried out without cutting off the power to the gaming device; (2) "summary" provides a "summary" of the plays or operations carried out; (3) "clear" operates to "clear" the various counters used in the gaming device, as well as clearing the memory containing the summary of operations carried out; and (4) "paper feed" is used to carry out the loading or feeding of paper for the printer.

The "detail" and "field" buttons are used in the programming of the gaming device along with LED's 8. The LED display contains a single digit field number indicator and a double digit field data indicator. The "field" push button selects fields from zero to nine while the "detail" push button selects specific data values pertaining to a particular field. All are displayed by LED display 8.

The fields are designated as: (0) printer selection, between one of two printers as indicated using the advance button, designating either 00 or 01; (1) setting the clock hours from 00 through 23; (2) setting the clock minutes from 00 through 59; (3) setting the clock months from 00 through 12; (4) setting the clock days from 00 through 31; (5) setting the clock years from 00 through 99; (6) operation selection for print out of an individual ticket by selecting 1 through 14 using the "advance" button, or printing all tickets by selecting 00; (7) testing the cycle and percentage settings without rolling the reels so as not to destroy current data; (8) setting the game win/lose percentage by selecting any of 15, 20, 25, 30, 40, 50, 75, 100 (by selecting 00); and (9) operator selection of a desired cycle by selecting 01 through 11, thereby indicating the win limits per cycle.

An electronic slot machine operates by generating virtual combinations of symbols to simulate the operation of a normal mechanical slot machine. This technique is already well known, and is better described in the patents incorporated herein by reference. In order to ensure that a slot machine operates in a manner consistent with the tables contained in FIGS. 2A–2D, it is necessary that limits be placed on the total number of wins with respect to the total number of losses. To obtain the benefits of the present invention, this must be done for different numbers of operations or plays within a given cycle, for cycles containing different numbers of plays, and for different winning percentages.

This is accomplished through the use of two counters. These can be contained within CPU 2 or simply be connected to CPU 2. Each time a winning or losing combination of virtual symbols is generated by the CPU 2, a check is made of the respective counter (either a winning status counter or losing status counter) to determine if the permissible number of preprogrammed wins or losses has occurred. For example, if a winning combination has been generated, and the win status counter has not gone to zero, the winning combination will be displayed to the player using reels in display 7, and a coupon with an appropriate prize will be generated for the player. During this operation, since an additional win has occurred, the win counter will be decremented by a value of 1.

If a winning combination of virtual symbols is generated and the win status counter is at 0, the CPU will select a virtual combination of symbols having a losing status. The losing status counter will be checked to determine if all the programmed losses have occurred. If the predetermined number of losses has not occurred, the losing combination will be displayed for the player. A coupon can still be printed for the losing player, offering condolences and suggesting a visit to the appropriate retailer sponsoring the gaming machine. During this operation, the losing counter will be decremented by a value of 1.

If either status counter has reached a value of 0, the machine will always select a combination corresponding to the other status. If both counters have reached 0, the gaming machine will start a brand new cycle according to preprogrammed instructions. Each cycle is defined by a predetermined number of plays or operations of the gaming machine which is preprogrammed so that a specific number of wins (based upon win/lose percentages) will occur. The type of prize corresponding to each win is also preprogrammed, and is reflected when a coupon is printed for a winning player. The winning percentage programmed for each cycle adheres to the tables found in FIGS. 2A–2D.

Figure 3:
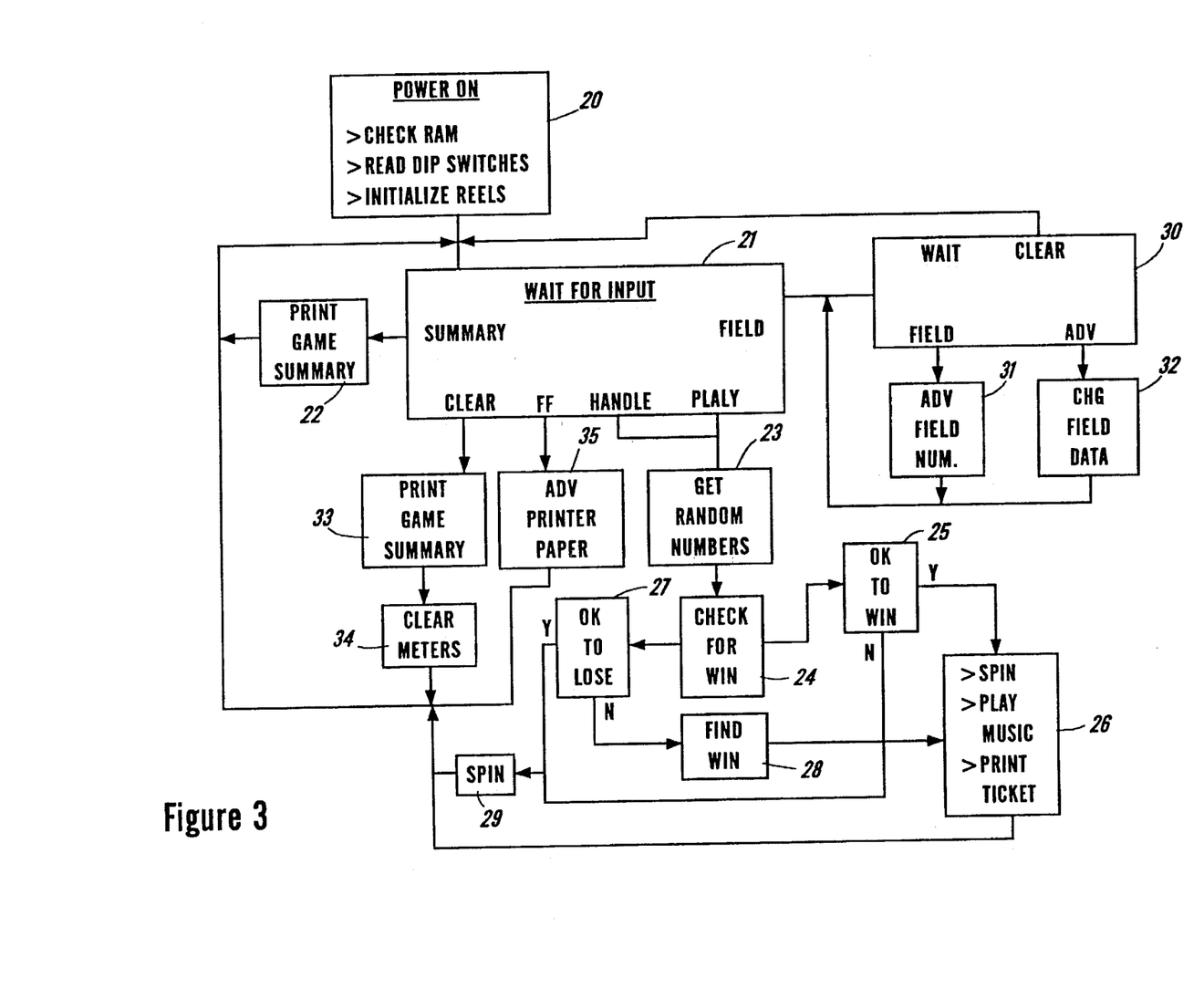
FIG. 3 is a block diagram representing functional attributes of one embodiment of the present invention.

FIG. 3 contains a rough flow diagram depicting the generalized operation of the subject gaming device as described above. This is only an example of one operating sequence and others can be used as long as the counting operation and the change of status operation are carried out to maintain the preprogrammed win percentage. The flow chart of FIG. 3 depicts a plurality of different operations not necessarily carried out at the same time, and encompassing different aspects of the gaming system. For example, blocks 23, 24, 25, 26, 27 and 28 depict a sequence of events occurring when a winning combination of virtual symbols is generated. The win counter is checked, a determination is made that a win is permissible and the virtual combination of symbols is displayed. There is also an option for playing music or creating other special effects.

Programming of the gaming device is carried out beginning at block 20 in which the gaming device is activated and moving to block 21 at which the device receives control instructions. Blocks 30–32 indicate programming steps carried out using the push buttons 5 as previously described.

Block 35 indicates a basic maintenance operation of advancing paper for the printer. This is done during routine maintenance, operation in the test mode and each time the printer is used for printing a coupon. Block 22 indicates a print game summary occurring when the machine is put into a demonstration mode or summary of the overall operation is required. The print game summary is also found at block 33 operating when a new cycle begins, at which the meters are cleared, the counters are re-initialized for the total numbers of wins and losses, and the gaming machine is initialized to begin a new cycle of play.

It is also possible to program a random winning combination, that is a winning combination that does not fall within the tables contained in FIGS. 2A–2D. A random combination is one that is not constrained by the number of plays or operations within a given cycle. There is no necessity that a random combination must occur within any given cycle, or at all. A valuable prize can be assigned to the random combination to add excitement to the game and further induce players to participate. Other less valuable prizes can be assigned to those virtual combinations of symbols which must occur within any given cycle. As a further inducement to play, a more valuable prize can be assigned to a winning combination which occurs only once within each cycle. This prize would of course be less valuable than that assigned to the random combination but will be more valuable than those prizes assigned to those winning combinations which must occur within each cycle based upon the preprogrammed winning percentage.

There are five versions of the game. The first version offers fourteen prizes. Twelve of these prizes are assigned to combinations of symbols having approximately equal chances of occurring. The thirteenth and fourteenth prizes (assigned to BBB and 777, respectively) will occur only once per cycle.

The second version of the game offers thirteen prizes. Twelve of these are assigned to virtual combinations of symbols which have an unequal chance of occurring within a given cycle. The thirteenth prize is assigned to two combinations of symbols (BBB or 777) occurring only once during the operating cycle.

A third version of the game can use either thirteen or fourteen prizes. Twelve of the prizes are assigned to winning combinations of virtual symbols having approximately equal chances of occurring within any given cycle. A thirteenth prize can be assigned to a special combination of virtual symbols such as BBB, occurring only once during each cycle. The fourteenth prize can be assigned to a combination, such as 777, which occurs on a totally random basis. It is noted that the 777 combination is not ever pre-selected. If the machine operates on the basis of 128 virtual stops (as opposed to sixty-four virtual stops used on most mechanical slot machines the odds will be 2097152 to 1 for this combination to occur. Since a valuable prize is normally associated with a random selection such as 777, special security precautions must be taken. Consequently, the game meters and options should only be operated or changed with a password combination, using buttons 5 on the gaming device. Further, the machine will be set up to permit only a predetermined number of plays (usually 10,000) then the gaming machine will not respond to any of the buttons 5. The gaming device must be reset and cleared by means of a preprogrammed password entered using the buttons 5. A different version of the game offers two prizes. Each of the prizes is associated with a combination of virtual symbols occurring only once during each cycle.

Any of the aforementioned versions can be operated with a gaming device that is controlled from a separate computer. Thus, the prize data would be downloaded into a gaming device RAM (not shown) associated with the CPU of the gaming device. This would allow changing the prizes assigned to the winning combinations of virtual symbols, as well as the creation of prize text by an operator. Such editing could be done on site using an IBM compatible computer and the appropriate cable. In the alternative, remote programming could be carried out using a modem and telephone connection.

It will be readily seen by one of ordinary skill in this art that the present invention fulfills all of the objects set forth above. After reading the foregoing specification, one of ordinary skill in the art will be able to effect various changes, substitutions of equivalents and various other aspects of the invention as broadly disclosed herein.

Although a number of arrangements of the present invention have been mentioned by way of example, it is not intended that the invention be limited thereto. For example, the present invention can be adapted to use different tables than those contained in FIGS. 2A–2D. Further, any number of different random number or symbol generation programs can be used to simulate the operation of a normal mechanical slot machine. Any sequence of operation which maintains the use of checking the win and lose counters and switches from win to lose status (and vice versa) when appropriate can be used. Programming of the gaming device can be carried out using any number of different inputs and programming arrangements. Different prize combinations and occurrences thereof can be used besides the ones suggested in the specification and Appendices. It is therefore intended that the protection granted hereon be limited only by the definition contained in the appended claims and equivalents thereof. Accordingly, this invention should be considered to include any and all configurations, modifications, variations, combinations or equivalent arrangements falling within the scope of the following claims.

What is claimed is:

1. Method for distributing prizes using a gaming machine, comprising the steps of:

(a) activating said gaming machine to carry out a play by selecting one of a plurality of positions in a memory table and a combination of symbols associated with the selected position where each combination of symbols in said memory table is predetermined to indicate win/lose status and a single selection of each combination of symbols from said table constitutes an entire gaming cycle for said machine;

(b) indicating win or lose status of said selected position from said memory table based upon a pre-designated combination of symbols associated with said selected position, and eliminating the selected position in the memory table from further selection in a current gaming cycle; and (c) checking a plurality of counters to determine if said gaming cycle is complete; step (a) further comprising the sub-step of randomly picking one of 128 virtual stops based upon operation of a virtual slot machine where each of the virtual stops has a corresponding position in said memory table; said virtual operation of said virtual slot machine being carried out by random selection of a position on said table; said method, further comprising a preliminary step of (d) selecting one of a plurality of memory tables to program a predetermined win/lose percentage said preliminary step of selecting further comprising (i) programming a plurality of combinations of symbols to have the same chance of occurrence within a single gaming cycle defined by a predetermined number of plays by adjusting occurrences of combinations of symbols in a selected memory table;

(ii) preprogramming at least one of said plural combinations of symbols to have less chance of occurrence than others of said plural virtual combinations of symbols by adjusting occurrences of combinations of symbols in a selected memory table; and (iii) selecting at least one of said plurality of combinations of symbols to have an absolute random chance of occurrence independent of said gaming cycle.

2. The method of claim 1, wherein said preliminary step comprises a sub-step of assigning prizes to selected combinations of symbols.

3. The method of claim 2, wherein different prizes are assigned different chances of selection based upon predetermined occurrences of combinations of symbols associated with said prizes.

4. A promotional gaming device including:

(a) activation means for starting operation of said gaming device to carry out a play;

(b) a central processing unit comprising:
        (i) means for selecting a position from a preprogrammed memory table,
        (ii) means for determining win/lose status based upon a pre-programmed combination of symbols associated with said selected position in said memory table, and eliminating said selected position of said memory table from further selection in a current gaming cycle,
        (iii) means for counting occurrences of win/lose status to determine completion of a gaming cycle defined by a predetermined number of plays,
        (iv) means for selecting a memory table upon completion of a current gaming cycle;

(c) a display arranged to indicate said selected position of symbols to a player operating said gaming device;

(d) means for generating coupons indicative of both said win/lose status and a corresponding prize; and (e) means for selecting an additional memory table for a successive cycle where said additional memory table defines a predetermined number of plays, a plurality of combinations of symbols associated with positions in said additional memory table determining occurrences of win/lose status.

5. A promotional gaming device of claim 4, further comprising:

(f) means for adjusting said means for counting when said occurrences of winner and loser status are not at predetermined values.

6. A promotional gaming device including:

(a) activation means for starting operation of said gaming device to carry out a play;

(b) a central processing unit comprising:
        (i) means for selecting a position from a preprogrammed memory table,
        (ii) means for determining win/lose status based upon a pre-programmed combination of symbols associated with said selected position in said memory table, and eliminating said selected position of said memory table from further selection in a current gaming cycle,
        (iii) means for counting occurrences of win/lose status to determine completion of a gaming cycle defined by a predetermined number of plays,
        (iv) means for selecting a memory table upon completion of a current gaming cycle;

(c) a display arranged to indicate said selected position of symbols to a player operating said gaming device; and (d) means for programming said central processing unit for a specific number of wins and losses for each said cycle by section of memory table characteristics;

said means for programming further comprising
        (i) means for determining the frequency of occurrence of a plurality of said combinations of symbols by adjusting memory table characteristics;
        (ii) means for assigning corresponding prizes to each of said combination of symbols; and
        (iii) means for assigning random percentage of occurrence to at least one of said plurality of combinations of symbols independent of a gaming cycle.

* * * * *